UNITED STATES PATENT OFFICE.

LUDWIG SCHMIDT, OF MUNICH, GERMANY.

PROCESS FOR THE PREPARATION OF PYROCATECHIN ALDEHYDE.

1,326,973.　　　　Specification of Letters Patent.　　Patented Jan. 6, 1920.

No Drawing.　　Application filed March 31, 1917.　Serial No. 159,035.

*To all whom it may concern:*

Be it known that I, Dr. LUDWIG SCHMIDT, subject of the Emperor of Germany, residing at Munich, Germany, have invented certain new and useful Improvements in Processes for the Preparation of Pyrocatechin Aldehyde, of which the following is a specification.

If piperonal is treated with thionylchlorid at the temperature of the water bath, a reaction takes place according to the equation:

$$R.CHO + SOCl_2 = R.CHCl_2 + SO_2$$

Piperonaldichlorid (piperonylchlorid) of a fusing point of 59° C. being formed besides free sulfurous acid (see *Ber. Deutsche Chem. Ges.* vol. 41 page 1917 and *Journ. Chem. Soc.* vol. 93 (I) page 572).

I have found that piperonaldichlorid by the action of 4 mol. of gaseous chlorin is converted completely and without formation of by-products into dichlorpiperonylchlorid, a substitution of the two methyl hydrogen atoms taking place, while hydrochloric acid is split off, thus:

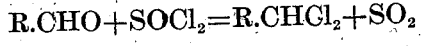

The saponification of the dichlorpiperonylchlorid with water yields pyrocatechin-aldehyde, carbonic and hydrochloric acids being split off.

The chlorination can be effected with or without solvents, for instance with benzene, chloroform or carbon tetrachlorid. It is also of no material difference for the formation of the final product whether the action of thionylchlorid and gaseous chlorin on piperonal takes place successively or simultaneously. The reaction proceeds very quickly and even spontaneously if it is carried out in direct sun-light or under the influence of ultraviolet rays.

*Example.*

15 kilo of piperonal are treated with 12 kilo of thionylchlorid. The solution formed is heated on the water-bath, until the reaction is completed. 14.2 kilo of gaseous chlorin, preferably taken from a steel cylinder containing compressed chlorin, are passed into the solution, whereby the formation of dichlorpiperonylchlorid is effected. The product of reaction is decomposed by water and the pyrocatechin aldehyde is recovered by extraction with ether or by boiling down.

I have also found, that the same reaction between piperonal and thionylchlorid is excellently suited for the protection of the aldehyde group, whereby a good yield of pyrocatechin aldehyde is also obtained. The sulfurous acid formed as a by-product does not interfere with the action of the chlorin on the methyl group and it is immaterial whether thionylchlorid and chlorin gas come into action successively or simultaneously. I can also effect the reaction with or without solvents, for instance chloroform.

What I claim is:—

1. A process for the preparation of pyrocatechin aldehyde consisting in treating piperonal with thionylchlorid and gaseous chlorin, and then saponifying the dichlorpiperonylchlorid thus formed with water, essentially as described.

2. A process for the preparation of pyrocatechin aldehyde consisting in treating piperonal with thionylchlorid and passing gaseous chlorin into the solution, and then saponifying the dichlorpiperonylchlorid thus formed with water, essentially as described.

In testimony whereof I affix my signature in presence of two witnesses.

Dr. LUDWIG SCHMIDT.

Witnesses:
　HERMANN SCHMIDT,
　NOVST SCHMIDT.